US012520883B2

(12) United States Patent
Bradley et al.

(10) Patent No.: US 12,520,883 B2
(45) Date of Patent: Jan. 13, 2026

(54) PROTECTIVE GARMENT HAVING IMPROVED CLOSING FLAP

(71) Applicant: DUPONT SAFETY & CONSTRUCTION, INC, Wilmington, DE (US)

(72) Inventors: Alexander Bradley, Richmond, VA (US); Colin McLachlan, Sumter, SC (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 93 days.

(21) Appl. No.: 18/465,869

(22) Filed: Sep. 12, 2023

(65) Prior Publication Data

US 2024/0090597 A1 Mar. 21, 2024

Related U.S. Application Data

(60) Provisional application No. 63/407,261, filed on Sep. 16, 2022.

(51) Int. Cl.
*A41D 13/00* (2006.01)
*A62B 17/00* (2006.01)

(52) U.S. Cl.
CPC ........ *A41D 13/0002* (2013.01); *A62B 17/006* (2013.01); *A41D 2300/322* (2013.01);
(Continued)

(58) Field of Classification Search
CPC ........... A41D 13/0002; A41D 13/0005; A41D 2300/322; A41D 2300/328; A41D 3/04;
(Continued)

(56) References Cited

U.S. PATENT DOCUMENTS 2,283,642 A * 5/1942 Murray .................. A44B 19/34 2/265
2,369,432 A 2/1945 Byrns
(Continued)

FOREIGN PATENT DOCUMENTS

EP 3039977 A1 7/2016

OTHER PUBLICATIONS

PCT International Search Report for Application No. PCT/US2023/073818; Robert Thielgen, Authorized Officer; ISA/EPO; Nov. 22, 2023.
(Continued)

*Primary Examiner* — Heather Mangine

(57) ABSTRACT

A garment comprising protective apparel fabric, a fastener assembly for joining a first and a second area of the protective apparel fabric, and a closing flap for covering the fastener assembly, the closing flap attached to the outer garment surface of first area of protective apparel fabric, the closing flap having a size and shape such that the covering area of the closing flap fully covers the fastener assembly when the fastener assembly is closed, the closing flap having an average bending rigidity that is at least 7.5 percent greater than the average bending rigidity of the protective apparel fabric; the color and/or visual marking or pattern of the closing flap can be different from or distinct from other parts of the garment.

25 Claims, 3 Drawing Sheets

(52) U.S. Cl.
CPC .... *A41D 2300/328* (2013.01); *A41D 2500/30* (2013.01); *A41D 2500/50* (2013.01)

(58) Field of Classification Search
CPC .............. A41D 27/10; A41B 2300/322; A41B 2300/328; A62B 17/00; A62B 17/001
See application file for complete search history.

(56) References Cited

U.S. PATENT DOCUMENTS 2,371,776 A * 3/1945 Orman .................. A44B 19/32 24/389
2,442,507 A * 6/1948 Murphy ................ A41D 17/02 36/2 R
2,530,453 A * 11/1950 Eagle .................. A44C 15/004 D2/857
2,585,175 A * 2/1952 Rosenberg ............... A41D 1/06 D2/742
2,639,432 A * 5/1953 Kaplan ................ A41H 37/003 2/96
2,677,131 A * 5/1954 Shuster ................. A41D 27/10 2/270
2,717,437 A 9/1955 Mestral
3,164,840 A * 1/1965 Reynolds ................ G21F 3/025 2/457
3,378,853 A * 4/1968 Fierst ...................... A41D 1/04 2/90
3,449,764 A * 6/1969 Fazio ..................... A41D 27/24 2/96
3,478,141 A 11/1969 Dempsey et al.
3,769,634 A * 11/1973 Florens, Jr. ............... A41F 1/00 2/74
3,811,979 A 5/1974 Dempsey et al.
3,920,874 A 11/1975 Dempsey et al.
3,962,729 A * 6/1976 Cook ..................... A44B 19/34 2/265
4,214,321 A 7/1980 Nuwayser
4,272,851 A * 6/1981 Goldstein ............ A62B 17/001 2/82
4,277,848 A * 7/1981 Boehland ................ A41D 1/04 2/115
4,296,498 A * 10/1981 Vinson ..................... A41D 1/04 2/115
4,507,806 A 4/1985 Coombs
4,561,121 A * 12/1985 Ehring .................. A41D 13/00 2/458
4,628,545 A * 12/1986 Metzler ................ A41H 37/003 2/265
4,710,981 A * 12/1987 Sanchez ................. A41D 27/08 40/586
4,772,510 A 9/1988 McClure
4,817,210 A * 4/1989 Aldridge ............. A62B 17/003 2/87
4,833,010 A 5/1989 Langley
4,855,178 A 8/1989 Langley
4,856,113 A * 8/1989 Moscatelli ........... A62B 17/001 2/84
4,920,575 A 5/1990 Bartasis et al.
4,924,613 A * 5/1990 Levin ...................... G09F 21/02 40/586
4,991,233 A * 2/1991 Hall ....................... A41D 27/08 40/586
4,999,848 A * 3/1991 Oney ....................... A41D 1/04 40/586
5,035,941 A 7/1991 Blackburn
5,159,719 A * 11/1992 Aumann .................. A41D 3/04 2/87
5,162,148 A 11/1992 Boye et al.
5,202,086 A 4/1993 Baliga et al.
5,361,523 A * 11/1994 Robinson ............... A41D 27/08 40/586
5,379,461 A * 1/1995 Wilmers ................ A41D 27/08 40/586
5,398,343 A * 3/1995 Kuracina ............... A41D 27/28 40/586
5,444,898 A * 8/1995 Norvell .................. A44B 19/32 24/389
5,529,823 A * 6/1996 Aumann ................ A41D 27/04 2/81
5,626,947 A 5/1997 Hauer et al.
5,794,267 A * 8/1998 Wallace ................. A41D 27/08 2/69
5,822,802 A * 10/1998 Chou ................ A41D 13/1254 2/235
5,972,147 A 10/1999 Janis
6,088,833 A * 7/2000 Welchel ............ A41D 13/0002 2/457
6,314,581 B1 * 11/2001 Bond ....................... A41D 1/04 2/129
6,571,432 B1 * 6/2003 Rindle ...................... A41F 1/00 24/389
6,651,254 B1 * 11/2003 Chang .................... A44B 19/32 2/87
6,668,384 B1 * 12/2003 Chang .................... A41D 27/24 2/96
6,826,808 B2 12/2004 Kutschka
7,832,032 B2 * 11/2010 Haislip .................. A41D 15/04 5/413 R
9,265,292 B2 * 2/2016 Smith .................. A41D 15/002
9,642,420 B2 5/2017 McLachlan
9,675,144 B2 6/2017 McLachlan
9,877,527 B1 * 1/2018 Marshall ................ A41D 27/08
10,524,525 B2 1/2020 Yazdi et al.
2002/0078486 A1 * 6/2002 Barnes ................... A41D 3/005 2/84
2002/0174476 A1 * 11/2002 Cochran ............. A62B 17/003 2/97
2004/0006815 A1 * 1/2004 Carroll ................. A62B 17/006 2/457
2004/0033739 A1 * 2/2004 Courtney ................ B63C 9/087 441/88
2004/0139528 A1 * 7/2004 Hord ...................... A44B 19/32 2/96
2005/0102729 A1 * 5/2005 Snedeker ............... A41D 27/24 2/96
2006/0059601 A1 * 3/2006 Opitz ..................... A41D 27/00 2/108
2006/0162042 A1 * 7/2006 Chang .................. A41H 37/001 2/96
2008/0040837 A1 * 2/2008 King ...................... A41D 27/00 112/475.16
2008/0209611 A1 9/2008 Tyrrell
2008/0252461 A1 * 10/2008 Sugata ................... G06K 19/04 340/572.1
2008/0289086 A1 * 11/2008 Grilliot .............. A41D 13/0007 2/455
2009/0049710 A1 * 2/2009 Barnett .................... A43B 3/04 36/50.1
2010/0269312 A1 * 10/2010 Wagner ................ A41H 37/003 24/301
2011/0072556 A1 * 3/2011 Bang ...................... A41D 27/08 2/247
2011/0258749 A1 * 10/2011 Hibbs .................... A41D 15/04 2/84
2013/0185841 A1 * 7/2013 Berkowitz ........... A44B 19/301 24/420
2013/0269090 A1 * 10/2013 Liu .................... A41D 13/0025 2/456
2013/0276202 A1 * 10/2013 Forbes ............... A41D 13/1236 2/114
2014/0075643 A1 * 3/2014 Greer ................. A41D 13/0007 2/243.1
2015/0082517 A1 * 3/2015 Mclachlan ......... A44B 18/0003 24/443
2015/0082518 A1 * 3/2015 Mclachlan ................ A41F 1/00 24/442
2015/0128333 A1 * 5/2015 Atallah ................ A62B 17/001 24/433

(56) References Cited

U.S. PATENT DOCUMENTS

| | | | | |
|---|---|---|---|---|
| 2016/0151648 | A1* | 6/2016 | Yadav | A62B 17/006 2/457 |
| 2016/0165973 | A1* | 6/2016 | Yazdi | A41D 27/28 2/457 |
| 2016/0267817 | A1* | 9/2016 | McKee | A41D 27/08 |
| 2016/0286873 | A1* | 10/2016 | Knipp | A41D 31/00 |
| 2017/0013891 | A1* | 1/2017 | Olvera | A41D 13/02 |
| 2017/0311663 | A1* | 11/2017 | Wollschlaeger | A41D 15/00 |
| 2018/0255853 | A1* | 9/2018 | Spathas | A41D 1/21 |
| 2018/0304106 | A1* | 10/2018 | O'Leary | A62B 17/001 |
| 2018/0345050 | A1* | 12/2018 | Cox | A43B 3/16 |
| 2019/0059815 | A1* | 2/2019 | Smith | A41D 27/08 |
| 2019/0116899 | A1* | 4/2019 | Williams | A41D 1/02 |
| 2019/0365000 | A1* | 12/2019 | Simmons | A41D 27/28 |
| 2020/0154801 | A1* | 5/2020 | Burke | A41D 13/1245 |
| 2020/0214401 | A1* | 7/2020 | Zahradka | A44B 19/34 |
| 2020/0221802 | A1* | 7/2020 | They | A41D 1/06 |
| 2020/0316412 | A1* | 10/2020 | Weber | A62B 17/006 |
| 2021/0030074 | A1* | 2/2021 | Paradis | A61M 21/02 |
| 2021/0120941 | A1* | 4/2021 | Walton | A45F 4/12 |
| 2021/0137177 | A1* | 5/2021 | Sun | A41D 27/24 |
| 2021/0137190 | A1* | 5/2021 | Huling | A41D 27/20 |
| 2021/0235821 | A1* | 8/2021 | Harris | A44B 19/26 |
| 2021/0345692 | A1* | 11/2021 | Xu | A41D 1/06 |
| 2022/0132953 | A1* | 5/2022 | Green | A41D 19/0044 2/159 |
| 2023/0270185 | A1* | 8/2023 | Gonzalez | A41D 1/065 2/79 |
| 2024/0090597 | A1* | 3/2024 | Bradley | A62B 17/00 |
| 2025/0120459 | A1* | 4/2025 | Cronin | A41D 3/04 |

OTHER PUBLICATIONS

Release of Livmore® 4500AS, a protective clothing that complies with "JIS T 8115 Chemical Protective Clothing Type 4" (sealed clothing for spray protection) and is both water-resistant and breathable; Toray Industries, Inc.; Apr. 20, 2022 https://www.toray.co.jp/news/details/20220418151353.html.

* cited by examiner

PROTECTIVE GARMENT HAVING IMPROVED CLOSING FLAP

BACKGROUND OF THE INVENTION

Field of the Invention

This invention relates to improved features for protective garments that help ensure garment fasteners are closed while the garment is being worn, and if desired, can visually indicate the garment fasteners have become undone while the garment is being worn.

Description of Related Art

One function of certain personal protective apparel worn by workers is to prevent or reduce environmental contaminants from contacting the skin. Such apparel can include encapsulating liquid-resistant and/or chemical-resistant suits or garments, or suits or garments designed to prevent exposure to particulates, or suits or garments designed to prevent a variety of hazards from contacting the skin. Such apparel can include such things as coveralls, shirts, coats, or a combination of these items. The apparel can be made with a wide variety of proprietary protective garment fabrics, barrier fabrics, laminates, and films. The apparel can also include nonwoven and/or woven fabrics and laminates of such materials with films. In some embodiments, the apparel material is a multilayer-film-and-nonwoven laminate. In some embodiments the apparel material is a nonwoven that resists penetration by liquids and/or particulates.

Clearly, in preventing liquid and/or particulate intrusion, openings in the apparel are potential weak points, since the openings must be present in order for the apparel to be donned, and after donning the openings must then be adequately closed or sealed. Any improvement in ensuring a worker's garment is sealed prior to entering a potentially hazardous area, or helps the garment remain sealed in the potentially hazardous area, or any improvement that would indicate a garment has become unsealed or unfastened while in use in a potentially hazardous environment, would be highly desired.

BRIEF SUMMARY OF THE INVENTION

This invention relates to a garment comprising protective apparel fabric, a fastener assembly for joining a first and a second area of the protective apparel fabric, and a closing flap, each first and second area of protective apparel fabric having an inner garment surface and an outer garment surface and the fastener assembly comprising a fastener having a first fastener tape and a second fastener tape, each fastener tape having an inside surface and an outside surface, each fastener tape further having an attachment area having an inside surface and an outside surface, and a closing area having a row of cooperating fastener elements mounted thereon;

wherein the attachment area of the first fastener tape is attached to the first area of protective apparel fabric, and the attachment area of the second fastener tape is attached to the second area of protective apparel fabric, the closing flap also having an attachment area having an inside surface and an outside surface, and a covering area having an inside surface and an outside surface, wherein the attachment area of the closing flap is attached to either the inside or outside surface of the first fastener tape or the inner or outer garment surface of first area of protective apparel fabric, or some combination of these; the closing flap having a size and shape such that the covering area of the closing flap fully covers the row of cooperating fastener elements mounted on the second fastener tape of the fastener assembly when the fastener assembly is closed, and wherein the closing flap has an average bending rigidity that is at least 7.5 percent greater than the average bending rigidity of the protective apparel fabric.

This invention also relates to a garment comprising protective apparel fabric, a fastener assembly for joining a first and a second area of the protective apparel fabric, and a closing flap, each first and second area of protective apparel fabric having an inner garment surface and an outer garment surface, the fastener assembly having one or more first cooperating fastening element and one or more second cooperating fastening element, wherein the first fastening element is attached to the first area of protective apparel fabric, the second fastening element is attached to the second area of protective apparel fabric, the closing flap having an attachment area having an inside surface and an outside surface, and a covering area having an inside surface and an outside surface, wherein the attachment area of the closing flap is attached to either the inner or outer garment surface of first area of protective apparel fabric, the closing flap having a size and shape such that the covering area of the closing flap fully covers the first and second cooperating fastening elements of fastener assembly when the fastener assembly is closed, and wherein the closing flap has an average bending rigidity that is at least 7.5 percent greater than the average bending rigidity of the protective apparel fabric.

This invention also relates to a garment comprising protective apparel fabric, a fastener assembly for joining a first and a second area of the protective apparel fabric, and a closing flap, each first and second area of protective apparel fabric having an inner garment surface and an outer garment surface and the fastener assembly comprising a fastener having a first fastener tape and a second fastener tape, each fastener tape having an inside surface and an outside surface, each fastener tape further having an attachment area having an inside surface and an outside surface, and a closing area having a row of cooperating fastener elements mounted thereon;

wherein the attachment area of the first fastener tape is attached to the first area of protective apparel fabric, and the attachment area of the second fastener tape is attached to the second area of protective apparel fabric, the closing flap also having an attachment area having an inside surface and an outside surface, and a covering area having an inside surface and an outside surface, wherein the attachment area of the closing flap is attached to either the inside or outside surface of the first fastener tape or the inner or outer garment surface of first area of protective apparel fabric, or some combination of these; the closing flap having a size and shape such that the covering area of the closing flap fully covers the row of cooperating fastener elements mounted on the second fastener tape of the fastener assembly when the fastener assembly is closed, and wherein the closing flap has a first color, or a first visual marking or pattern, and the protective apparel fabric has a different second color, or a different second visual marking or pattern, or only one of the closing flap or protective apparel fabric has a visual marking or pattern.

This invention also relates to a garment comprising protective apparel fabric, a fastener assembly for joining a first and a second area of the protective apparel fabric, and a closing flap, each first and second area of protective apparel fabric having an inner garment surface and an outer garment surface and the fastener assembly comprising a fastener having a first fastener tape and a second fastener tape, each fastener tape having an inside surface and an outside surface, each fastener tape further having an attachment area having an inside surface and an outside surface, and a closing area having a row of cooperating fastener elements mounted thereon;

wherein the attachment area of the first fastener tape is attached to the first area of protective apparel fabric, and the attachment area of the second fastener tape is attached to the second area of protective apparel fabric, the closing flap also having an attachment area having an inside surface and an outside surface, and a covering area having an inside surface and an outside surface, wherein the attachment area of the closing flap is attached to either the inside or outside surface of the first fastener tape or the inner or outer garment surface of first area of protective apparel fabric, or some combination of these; the closing flap having a size and shape such that the covering area of the closing flap fully covers the row of cooperating fastener elements mounted on the second fastener tape of the fastener assembly when the fastener assembly is closed, and wherein the closing flap has a first color, or a first visual marking or pattern, and the second fastener tape has a different second color, a different second visual marking or pattern, or only one of the closing flap or second fastener tape has a visual marking or pattern.

DETAILED DESCRIPTION OF THE INVENTION

This invention relates to a protective apparel garment comprising protective apparel fabric having an improved closing flap. Typically, a worker dons a protective garment such as a coverall through an opening, such as a center front opening provided with a slide fastener such as a zipper. After donning the garment, the worker moves the zipper slide to close the garment. On some garments, a closing flap, which is typically only attached to one side of the opening or the other, is used to cover the zipper as an extra level of protection; however, wind or worker activity can cause the closing flap to open, as only one side of the flap is typically attached to the garment. The improved closing flap described herein has less propensity to open while the garment in being worn, therefore helping to ensure the extra level of protection desired by the use of the closing flap. This is achieved by providing the closing flap with an average bending rigidity that is at least 7.5 percent greater than the average bending rigidity of the protective apparel fabric used to make the garment body.

In an optional embodiment, the color and/or visual pattern of the area of the garment that is covered by the closing flap when the fastener assembly is closed can be made different from the color and/or visual pattern of the closing flap and the color and/or visual pattern of the areas of garment that are not covered by the closing flap. This provides a visual indicator that the garment fastener is either not fully closed; or the fastener has become undone if the fastener was fully closed when the garment was first donned. All of these can contribute to improved safety for the worker.

Therefore, the invention relates to a protective apparel garment comprising protective apparel fabric, a fastener assembly for joining a first and a second area of the protective apparel fabric, and a closing flap for covering at least a portion of the fastener assembly, the closing flap fabric having an average bending rigidity that is at least 7.5 percent greater than the average bending rigidity of the protective apparel fabric.

Figure 1:
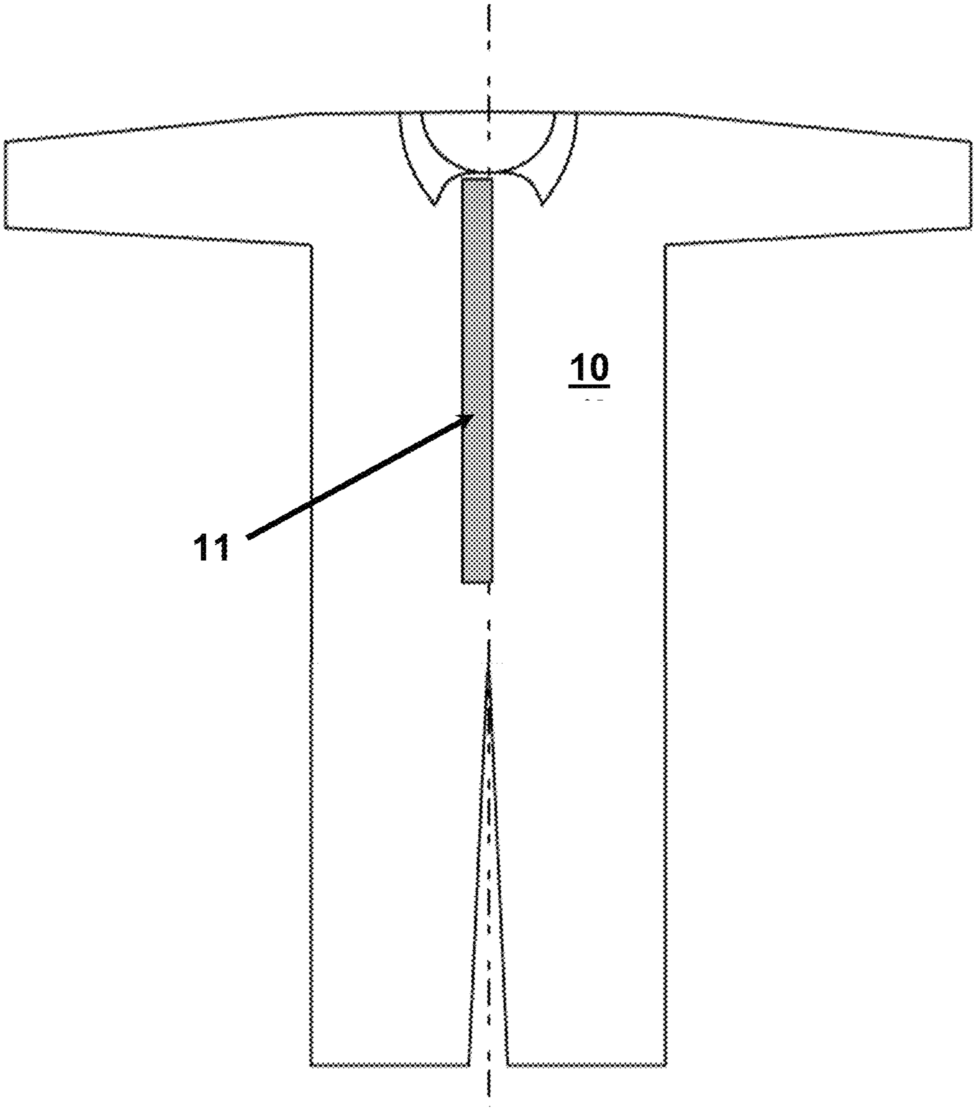
FIG. 1 is a drawing of one embodiment of a coverall provided with a closing flap covering a fastener assembly.

FIG. 1 is a drawing of one embodiment of a coverall 10 provided with a closing flap 11 covering a fastener assembly. This particular coverall has a torso portion for covering the torso of the wearer and having an opening for a neck or head connected to an opening for donning and doffing the garment; two arm portions for covering the wearer's arms connected to the torso portion, each arm portion ending in an opening for a hand or wrist, and two leg portions for covering the wearer's legs connected to the torso portion, each leg portion ending in an opening for a foot or ankle. The particular embodiment of FIG. 1 further illustrates an optional collar at the neck opening. For example, the garment could have a hood for the head with a face opening, or some other type of collar. In FIG. 1, the fastener assembly is not visible because the garment is shown with the fastener assembly closed and covered by the closing flap 11, which has a color that is different from the protective apparel fabric used for the torso portions (and other portions) of coverall 10.

In some embodiments, the fastener assembly comprises a fastener having a first fastener tape and a second fastener tape, each fastener tape having an inside surface and an outside surface, each fastener tape further having an attachment area having an inside surface and an outside surface, and a closing area having a row of cooperating fastener elements mounted thereon; wherein the attachment area of the first fastener tape is attached to the first area of protective apparel fabric, and the attachment area of the second fastener tape is attached to the second area of protective apparel fabric.

Figure 2:
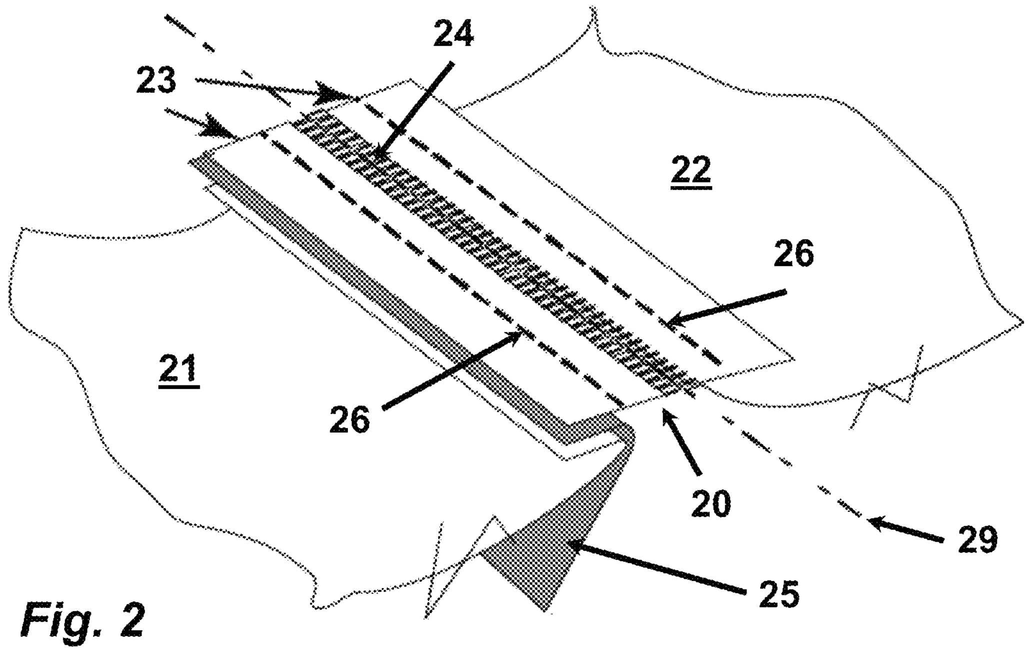
FIG. 2 is a detail of one possible method of attaching the closing flap to the garment.

By way of further illustration, FIG. 2 is a detail of one possible method of attaching the closing flap to the garment. This particular perspective is from the inside of the garment and illustrates a fastener assembly 20 joining a first area 21 of protective fabric and a second area 22 of the protective apparel fabric. The fastener assembly 20 has first and second fastener tapes (two zipper tapes) 23, with each zipper tape having a row of cooperating fastening elements, which in this case are the teeth of the zipper. Each fastener tape 23 is also known as a stringer tape. Each fastener tape or stringer tape has an attachment area for attaching each fastener tape to an area of protective apparel fabric and a closing area with each closing area having a row cooperating fastener elements (e.g, the zipper teeth) mounted thereon. One fastener tape 23 is shown attached to a first area of protective apparel fabric 21 and the other fastener tape 23 is shown attached to a second area of protective apparel fabric 22 by sewn stitches illustrated by the dashed lines 26 on each of the zipper tapes. As shown, that fastener assembly is closed and the teeth are meshed along the centerline of the fastener assembly 29, the meshed teeth being indicated by 24.

In the embodiment shown in FIG. 2, both first area 21 of protective fabric and second area 22 are folded and sewn to each of the zipper tapes 23 by stitches 26, which are illustrated by the dashed lines on each of the zipper tapes. The closing flap also has an attachment area for attaching the flap to the garment or fastener assembly, the flap having an inside surface and an outside surface, and a covering area for covering the cooperating fastener elements of the fastener assembly, the covering area also having an inside surface and an outside surface. In FIG. 2, inserted between first area 21 of protective fabric and the fastener assembly is the end of closing flap 25, which functions as an attachment area of the closing flap; the stitches on that zipper tape therefore also attach the closing flap to the garment by stitches. As shown, the inside surface of the closing flap is in contact with the fastener tape 23 of first area 21 of protective fabric, and the outside surface of the closing flap is in contact with the outer garment surface of the first area of protective apparel fabric 21. In this embodiment, the closing flap is attached to both the fastener assembly and the body of the garment by the stitches, but other possible attachments and arrangements are possible.

FIG. 2 illustrates one way of combining fabrics in the stitched area, the attachment area of the closing flap being positioned between the first area of protective apparel fabric and the first fastener tape, and also the feature of folding the ends of the protective apparel fabric after sewing the stitches. The end of the second area of protective apparel fabric 22 is also folded in a similar manner as the first area of protective apparel fabric 21 after sewing the fabric to a fastener tape 23.

After stitching, if desired, the fastener tapes (or stringer tapes in the case of a slide fastener) can be sealed by application of a suitable inner sealing tape over the stitches or over the joints between the various materials. Inner sealing tapes can include chlorinated polyethylene or thermo plastic synthetic rubber or other materials that are compatible with the materials being sealed. Representative commercially available inner sealing tapes are obtainable from such manufacturers as Adhesive Films, Inc., Bemis Associates, Inc., Worthen Industries, and others.

In other embodiments, instead of or in addition to stitching, any of the fastener tapes, the closing flap, or protective apparel fabric can be attached to each other by use of heat sealing, ultrasonic sealing, chemical welding, glue welding, and the like; and the fastener tape may additionally be coated with a compatible material to assist in this sealing. Additionally, instead of stitching or bonding the closing flap to the protective apparel fabric by use of the application of energy (heating, ultrasonics, etc.), any of the fastener tapes, the closing flap, or protective apparel fabric can be attached to each other by the application of an adhesive tape (e.g., single-sided tape, two-sided tape, etc.) if a suitable bond for the desired use is obtainable.

While FIG. 2 illustrates one preferred embodiment when a slide fastener is used as the fastener assembly, the attachment area of the closing flap can be attached to either the inside or outside surface of the first fastener tape 23, or the inner or outer garment surface of first area of protective apparel fabric 21, or some combination of these.

Figure 3:
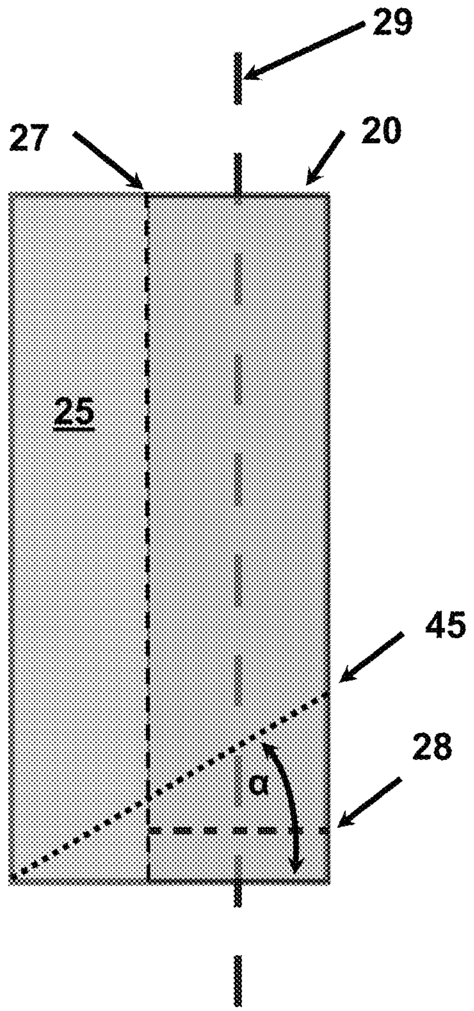
FIG. 3 is a detail of the relative position of the closing flap to the fastener assembly, in one possible embodiment.

FIG. 3 is a detail of the closing flap 25 covering closed fastener assembly 20, showing a preferred relative position of the closing flap to the closed fastener assembly. In this figure, closing flap 25 covers the closed fastener assembly 20 and further covers a portion of the second area of protective apparel fabric. The closed fastener assembly 20 is centered on the front of the garment, with the center of the front of the garment corresponding to the vertical centerline 29 of the closed fastener assembly 20. As shown in FIG. 2 but not duplicated in FIG. 3, one fastener tape 23 is shown attached to a first area of protective apparel fabric 21 and the other fastener tape 23 is shown attached to a second area of protective apparel fabric 22. FIG. 3 additionally shows a line of bottom stitching 28 that attaches the bottom ends of the fastener assembly to the protective apparel fabric of the garment; this line of bottom stitching is not attached to the closing flap but is underneath the flap and is preferably covered by the closing flap.

In FIG. 3, one vertical edge of the closing flap is attached to the first fastener tape and one vertical edge of that fastener assembly and one vertical edge of the closing flap (on the first area of protective apparel fabric side) line up visually. For clarity the protective apparel fabric is omitted. The other vertical edge of the closed fastener assembly 20 (the vertical edge of the second fastener tape) under the closing flap is shown by dashed line 27.

Additionally, in this embodiment, the closing flap is wider than the closed fastener assembly and the closing flap will further cover a part of the garment protective apparel fabric on one side of the closed fastener assembly, specifically a portion of the second area of protective apparel fabric 22 as so designated in FIG. 2, meaning that the vertical centerline of the closing flap is not aligned with the center of the front of the garment or the vertical centerline of the closed fastener assembly, which are both indicated by dashed line 29. This embodiment, with the offset closing flap, provides the garment with a distinctive appearance that draws one's attention to the center front of the garment.

Other embodiments of the closing flap are possible as long as the closing flap covers the closed fastener elements. For example, while a vertically-oriented fastener is shown in the figures, the fastener assembly could be installed in the garment at an angle across the torso. Also, in some instances it may be desirable for the closing flap to cover only the closed fastener elements.

In some embodiments, the fastener assembly has one or more first cooperating fastening element and one or more second cooperating fastening element, wherein the first fastening element is attached to the first area of protective apparel fabric and the second fastening element is attached to the second area of protective apparel fabric. For example, it is envisioned the cooperating fastening elements could include a set of snap fasteners, the cooperating fastening elements being the two sides of the snap fastener that mate to close the fastener. Likewise, in some instances the cooperating fastening elements can include a simple button and either a loop or buttonhole.

Other cooperating fastener elements can be used in the fastener assembly. Particularly useful fastener assemblies have cooperating fastener elements in the form of parallel rows of fastener elements. In one specific example, the fastener elements are cooperating slide fastener elements mounted on fastener tapes, also known as stringer tapes. For example, the particular fastener assembly shown in FIG. 2 is a slide fastener commonly known as a "zipper" comprising cooperating fastener elements in the form of parallel rows of teeth, each row attached to a fastener or stringer tape, that are meshed to close the fastener assembly. The slide fastener further comprises a slide cooperating with the fastener elements on the stringer tapes to mesh and un-mesh the teeth and open and close the slide fastener. Alternatively, the fastener assembly can have cooperating fastener elements in the form of a parallel row of interlocking channels or ribs such as found on plastic storage bags (e.g., Ziploc® brand bags) and generally disclosed in U.S. Pat. No. 6,826,808 to Kutschka; when used in garments, such fastener assemblies normally include a slide to assist in the interlocking and opening of the parallel channels, but as in the storage bags, the slider is a convenient but optional feature. In other embodiments, the fastener assembly can have cooperating fastener elements such as used in velvet-type hook-and-loop fastener such as the one disclosed in U.S. Pat. No. 2,717,437 to de Mestral that is more commonly known as a Velcro® fastener. Other fastener assemblies and cooperating fastener elements can be used, including such things as magnetic sealing strips such as sold by Gooper Hermetic, and toothless extruded zippers such as Tru® Zip by Nite Ize®.

The closing flap has a size and shape such that the covering area of the closing flap adequately covers the cooperating fastener elements, which can vary based on the type of fastener used. For example, if the fastener has rows of cooperating fastener elements as in a slide or hook-and-loop fastener, and the closing flap is mounted on the first area of protective apparel fabric and/or the first fastener tape, then the covering area of the closing flap should be adequate to cover at least the row of cooperating fastener elements mounted on the second fastener tape of the fastener assembly of the second area of protective apparel fabric when the fastener assembly is closed.

Alternatively, if the fastener assembly has one or more first cooperating fastening element and one or more second cooperating fastening element, such as used in snaps and buttons/buttonholes, wherein the first fastening element is attached to the first area of protective apparel fabric and the second fastening element is attached to the second area of protective apparel fabric, and the closing flap is attached to the inner or outer garment surface of the first area of protective apparel fabric; the closing flap should have a size and shape such that the covering area of the closing flap fully covers the first and second cooperating fastening elements of the fastener assembly when the fastener assembly is closed.

If desired, the closing flap does not necessarily have to fully cover the top end of the fastener assembly that has no cooperating fastener elements and that is generally at the neck or face opening of the garment; the closing flap only needs to cover the cooperating fastener elements that are fastening the first area of protective apparel fabric to the second area of protective apparel fabric.

The closing flap has an average bending rigidity that is at least 7.5 percent greater than the average bending rigidity of the protective apparel fabric. The bending rigidity (also known as bending stiffness) was measured using the Kawabata Evaluation System (KES). In some embodiments, the closing flap has an average bending rigidity that is at least 9 percent greater than the average bending rigidity of protective apparel fabric. In some embodiments, the closing flap has an average bending rigidity that is at least 25 percent greater than the average bending rigidity of protective apparel fabric. In other embodiments, the closing flap has an average bending rigidity that is at least 40 percent greater than the average bending rigidity of protective apparel fabric. In still other embodiments, the closing flap has an average bending rigidity that is at least 100 percent greater than or even at least 140 percent greater than the average bending rigidity of protective apparel fabric. It is believed that a closing flap having an average bending rigidity that is at least 250 percent greater than the average bending rigidity of protective apparel fabric can cause issues with garment fit and construction.

In some embodiments, the closing flap has an average bending rigidity of 0.2800 to 1.2000 grams force per square centimeter per centimeter of length. In some embodiments, the closing flap has an average bending rigidity of 0.3500 to 1.2000 grams force per square centimeter per centimeter of length. In other embodiments, the closing flap has an average bending rigidity of 0.8500 to 1.2000 grams force per square centimeter per centimeter of length. In still other embodiments, the closing flap has an average bending rigidity up to 1.2000 grams force per square centimeter per centimeter of length.

The closing flap has a width and a length. In a typical coverall, the closing flap is vertically oriented on the front of the garment and preferably has a length that extends from the head or neck opening of the coverall in the head or neck area to an area below the waist and above the upper in-seam of the pantlegs (or the junction of the pantlegs or leg portions to the torso portion of the garment if no actual in-seam is present). The actual length is dependent on the size of the coverall or garment.

The closing flap is generally a strip of material with the width being substantially less than the length. As used herein, the "flap cut width", is the width of the piece of closing flap material after it is initially cut, and the "flap width" or "finished width" is the width of the unattached portion of the flap cut width after the closing flap has been attached to the garment. In some embodiments, the flap cut width is from about 1.75 to 6 inches and in some embodiments is preferably 1.75 to 5 inches. In some other embodiments, the flap cut width is preferably 1.75 to 2.5 inches. In some embodiments, the unattached "flap width" or "finished width" is 1 to 3 inches; in some preferred embodiments, the flap width or finished width is 1.5 to 2.5 inches.

The top and bottom ends of the closing flap; that is, the ends of the closing flap at the neck opening and below the waist, respectively, can be cut straight across forming a rectangular-shaped closing flap as shown in the figures, or the shape can be preferably a rectilinear shape with one or more of the ends tapered as much as about 30 or 40 degrees from perpendicular, if desired. This is shown, in one embodiment, illustrated as dotted line 45 on FIG. 3 having an angle $\alpha$ of about 30 degrees. Additionally, the closing flap can be cut such that the ends taper from both sides, with the finished center of the closing flap ending in a point (again tapered as much as about 30 or 40 degrees from perpendicular, if desired).

The flap is preferably attached to or on a first side of the garment, preferably to or on a first area of protective apparel fabric, and the width of the flap preferably covers the fastener assembly. Additionally, in some further embodiments, the width of the flap further covers not only the fastener assembly, but the width of the flap is such that it further extends and covers a portion of the of the garment adjacent to the fastener assembly, preferably a portion of a second area of protective apparel fabric adjacent the fastener assembly. In some preferred embodiments the flap covers but is not attached to that portion of the second area of the protective apparel fabric.

If a visual indicator that the garment is closed is desired, the color of the area of the garment that is covered by the closing flap when the fastener assembly is closed can be made different from the color of the closing flap and the color of the areas of garment that are not covered by the closing flap. Specifically, in some embodiments the closing flap can have a color that is different from the color of the second fastener tape. In some embodiments the closing flap can have a color that is different from the color of the protective apparel fabric, particularly the closing flap can have a color that is different from the color of any covered area of protective apparel fabric (fabric covered by the closing flap), and that covered area of protective apparel fabric can preferably be different from the color of the protective apparel fabric not covered by the closing flap. For example, a pigmented or colored coating can be used to differentiate the color of the closing flap from other parts of the garment, or to differentiate the area covered by the closing flap from the closing flap or the uncovered protective apparel fabric. The pigmented or colored coating can also stiffen (i.e., increase the average bending rigidity) of the closing flap.

If desired, the closing flap can have a distinctive pattern, drawing one's attention to the flap, or the fastener assembly or the area covered by the flap having a contrasting visual pattern or other otherwise different color to indicate the fastener assembly is open and not fully covered by the flap. For example, the flap can be made distinctive by the garment having a closing flap having a visual marking or pattern and the second fastener tape or the fastener assembly either has a different visual marking or pattern or has no visual marking or pattern. Alternatively, the flap can be made distinctive by the garment having a closing flap having a visual marking or pattern and the protective apparel fabric either has a different visual marking or pattern or has no visual marking or pattern.

In some embodiments, since the average bending rigidity of the closing flap is higher than the protective apparel fabric used for the body of the garment, the closing flap material must differ in some way from the garment protective apparel fabric; that is, the protective apparel fabric used for the rest of the body of the garment. In a preferred embodiment, the closing flap material has the same or better protective performance as the garment protective apparel fabric. In other words, preferably the closing flap material is different from the garment protective apparel fabric, but the closing flap material has the same or better protective performance against anticipated hazards.

It is believed the average bending rigidity of the closing flap for any one protective fabric can be increased by the desired amount using any number of methods. In one embodiment, the garment protective apparel fabric has mechanical treatments that soften that fabric, while the closing flap material does not have any such mechanical treatments. In one preferred embodiment, the mechanical softening treatment involves localized stretching or breakage of surface bonds in a uniform manner over the entire surface of fabric to be softened. Such processes include the peg or pin softening processes such as disclosed U.S. Pat. Nos. 3,811,979 and 3,920,874 to Dempsey et al. These processes, and other such processes that locally stretch or work surface of the sheet, can reduce the sheet rigidity in a uniform manner across the entire sheet. Likewise, the fabric need not be softened and in turn will have a higher surface rigidity. As shown in the examples, one preferred embodiment utilizes a flash-spun polyethylene sheet bonded by embossing with no subsequent softening as the closing flap material; while a flash-spun polyethylene sheet bonded by embossing followed by pin softening is used as the garment protective apparel fabric.

Another method of increasing average bending rigidity is by the addition of mass to the fabric. For example, the average bending rigidity of the garment protective apparel fabric can be measured, and then that fabric can be modified by applying one or more layers of a coating or other treatment until the desired increase in average bending rigidity for a closing flap is achieved. Some non-limiting examples of this type of treatment include providing a flash-spun polyethylene or other nonwoven sheet bonded by embossing optionally followed by pin softening and then coating one or more surfaces of the sheet with a layer of polymer or other coating; providing a flash-spun polyethylene sheet or other nonwoven sheet bonded by embossing optionally followed by pin softening and then one or more surfaces of the sheet being further provided with a microporous film. Still other examples include providing a flash-spun polyethylene or other nonwoven sheet bonded by embossing and optionally followed by pin softening, which further is provided with an additional surface treatment, such as a flame retardant treatment.

Additional rigidity can also be provided to the nonwoven fabric by the application of films, either with or without intervening adhesives. For example, the closing flap material can be a flash-spun polyethylene or other nonwoven sheet bonded by embossing, and optionally followed by pin softening, that has additionally been provided with a film laminated to one or more surfaces of the sheet. Such film(s) are not thought to be limited, for example the film(s) could be microporous films or films of a single polymer or films comprising more than one polymer.

Preferably the closing flap is made from a single sheet of material, whether that sheet is a laminate, is coated or uncoated. Any coatings or films employed in the making of the closing flap material can contain pigments and/or other additives such as fillers that will impart additional stiffness to the coated fabric.

Preferably, the closing flap is made from a single layer fabric that is preferably not folded upon itself or specially hemmed to impart additional rigidity. This reduces the complexity of manufacturing the protective garment. However, if desired, the closing flap can be made from multiple layers of fabric; however, preferably the multiple layers of fabric are adhered (particularly at any cut edges) or tightly sewn together to attain the increase of average bending rigidity that is desired.

It is understood that as used herein, the average rigidity of the closing flap is considered to be the average rigidity of the fabric from which the closing flap is made, and such fabric is considered as "closing flap fabric" herein. For example, if a single layer fabric is used to make the closing flap, then the average rigidity of the closing flap is the same as the average rigidity as determined on the fabric cut to make that closing flap. Likewise, if more than one layer of a single fabric (a multilayer fabric) is used to make the closing flap, then the average rigidity of that closing flap is considered the average rigidity of the multilayer fabric used to make the closing flap, and the multilayer fabric is considered the "closing flap fabric". Additionally, it should be appreciated that a fabric or sheet structure might be considered a closing flap fabric in one garment, while that same fabric or sheet structure might be considered a garment body or protective apparel fabric in another garment, depending on how that fabric or sheet structure is paired with other fabrics used for, respectively, the garment body or protective apparel fabric and the closing flap fabric.

In some embodiments, the differences in the closing flap fabric from the garment body fabric preferably have a different "fabric hand" that is detectable and distinguishable by touch or feel; this can be especially useful for the worker donning the garment, as they can feel the garment is closed and the closing flap is in place. The presence of coatings, especially with pigments or fillers, can contribute to this tactile difference, as can lamination or the lack of substantial mechanical softening treatments to the closing flap material.

Some specific combinations of body fabrics and flap fabrics in garments include garments having a body fabric that is a pin-softened flash-spun polyethylene sheet bonded by embossing, and a flap fabric that is a flash-spun polyethylene sheet bonded by embossing but having no subsequent softening. Alternatively, the body fabric can be a pin-softened flash-spun polyethylene sheet bonded by embossing, while the flap fabric is either (a) a flash-spun polyethylene sheet bonded by embossing then either not softened or not followed by pin softening, (b) a flash-spun polyethylene sheet bonded by embossing followed by pin softening, and then one surface of the sheet was coated with a layer of polymer; (c) a flash-spun polyethylene sheet bonded by embossing followed by pin softening and an additional flame retardant treatment that stiffens the sheet; or (d) a flash-spun polyethylene sheet bonded by embossing followed by pin softening and having a film was laminated to one surface of the sheet.

Still other combinations could include a body fabric of a flash-spun polyethylene sheet bonded by embossing followed by pin softening and an additional flame retardant treatment that stiffens the sheet, combined with a flap fabric that is a flash-spun polyethylene sheet bonded by embossing followed by pin softening and further having a film was laminated to one surface of the sheet, because of the rigidity difference between these two fabrics.

Other specific combinations of body fabrics and flap fabrics in garments include garments having a body fabric that is either (a) a point-bonded sheet known in the art as spunbonded-melt-blown-spunbonded (SMS) that is a sandwich of a melt-blown layer between two melt-spun layers that are successively laid down and then bonded together, or (b) a point-bonded melt-spun sheet further provided with a microporous film on one surface; combined with a flap fabric that is either (a) a flash-spun polyethylene sheet bonded by embossing followed by pin softening, with or without one surface of the sheet coated with a layer of polymer; (b) a flash-spun polyethylene sheet bonded by embossing followed by pin softening and an additional flame retardant treatment that stiffens the sheet; or (c) a flash-spun polyethylene sheet bonded by embossing followed by pin softening and having a film laminated to one surface of the sheet.

The garment preferably comprises a protective apparel fabric. From a structural element standpoint, the use of "protective apparel fabric" as a structural element means the fabric used for the bulk of the garment, the fabric that covers the majority of the torso portion and any other arm or leg portions and is also referred to herein as the "garment body fabric" or simply as the "body fabric". When a protective apparel fabric is used in a closing flap, it is considered closing flap fabric and specifically spelled out that way herein.

From a compositional standpoint, the term "protective apparel fabric" is meant to include a wide variety of protective garment fabrics, barrier fabrics, laminates, and films. The term "protective apparel fabric" also includes nonwoven and/or woven fabrics and laminates of such materials with films or multilayer films. In some preferred embodiments the protective apparel fabric, and therefore the apparel material, is a multilayer-film-and-nonwoven laminate. In some embodiments the apparel material is a nonwoven that resists penetration by liquids and/or particulates, such as a nonwoven like Tyvek® spunbonded polyethylene. Other useful protective apparel fabrics protect against a wide variety of threats and include but are not limited to those disclosed in U.S. Pat. No. 5,626,947 (Hauer et al.); U.S. Pat. No. 4,855,178 (Langley); U.S. Pat. No. 4,272,851 (Goldstein); U.S. Pat. No. 4,772,510 (McClure); U.S. Pat. No. 5,035,941 (Blackburn); U.S. Pat. No. 4,214,321 (Nuwayser); U.S. Pat. No. 4,920,575 (Bartasis); U.S. Pat. No. 5,162,148 (Boye); U.S. Pat. No. 4,833,010 (Langley).

Some specific protective apparel fabrics include those made from flash-spun polyethylene sheets that are spun and then lightly bonded, followed by a softening treatment; or with no subsequent softening treatment. One method of providing such flash-spun sheets is described in U.S. Pat. No. 5,972,147 to Janis. Another method of providing a sheet, the loosely consolidated flash-spun polyethylene sheet is point-bonded by passing the sheet between one or more heated rolls with raised bosses and a resilient roll, as described in U.S. Pat. No. 3,478,141 to Dempsey et al. Where a softer flash-spun sheet is desired, either sheet may be softened by passing the sheet through a pin or peg softening device such as disclosed U.S. Pat. Nos. 3,811,979 and 3,920,874 to Dempsey et al. Either sheet can be further coated with various compositions or laminated to film to create treated, coated or film-laminated products.

Other protective apparel fabrics include spunbonded nonwovens, melt-blown sheets and spunbonded combinations of melt-spun and melt-blown layers (e.g., SMS), electroblown sheets and any combination thereof. The term "nonwoven" means the planar sheet structure comprises at least one web of randomly distributed fibrous material as opposed to woven or knitted fabrics that are made by interwoven yarns or interlocked yarn loops. In some preferred embodiments, the fibrous material in the nonwoven sheet is a synthetic polymer; in some embodiments the synthetic polymer is a thermoplastic polymer. In some preferred embodiments the fibrous material in the nonwoven sheet structure is free of added binder; that is, the fibrous material is bound in the sheet by melting of fibrous cross points in the sheet structure without additional binder compounds being added to the sheet. By fibrous, it is meant the material in the nonwoven sheet has some fibrous nature. This fibrous nature can be provided by such things as staple fibers, continuous or semi-continuous fibers, and/or plexifilamentary fibrous structures. The fibrous material can comprise a single material or a multitude of materials, either as a combination of different fibers or as a combination of similar fibers each comprised of different materials.

In some embodiments the fibrous nonwoven sheet structure prior to any additional treatment, coating, or film lamination, can have a basis weight of 75 grams per square meter or less. In some more preferred embodiments, the fibrous nonwoven sheet structure or the protective apparel fabric has a basis weight of 55 grams per square meter or less; and in some most preferred embodiments the fibrous nonwoven sheet structure or the protective apparel fabric has a basis weight of 45 grams per square meter or less. In some embodiments, the fibrous nonwoven structure or protective apparel fabric has a basis weight of 125 gram per square meters or less. In some embodiments the fibrous nonwoven structure or protective apparel fabric has a basis weight of 70 gram per square meters or less.

In some embodiments the garment comprising protective apparel fabric, fastener assembly, and closing flap is a Level A, B, C or D protective garment. Level A garments are used in situations that require the highest level of skin, respiratory, and eye protection, and are generally totally encapsulating vapor protective garments. Level B garments are used in situations that require the highest level of respiratory protection, but a lesser level of skin protection is needed. Level C garments are used in situations where atmospheric contaminants, liquid splashes, and other direct contact will not adversely affect or be absorbed by any exposed skin. Level D garments are used in situations where contamination is only a nuisance. There may be some instances where combinations of protective apparel rated for A, B, C, or D level may be used together.

In another embodiment, the garment comprising protective apparel fabric, fastener assembly, and closing flap is a secondary flame resistant protective garment. Secondary flame resistant protective clothing is designed for use in industrial settings where flame hazards may exist, and such clothing will not negatively impact the thermal performance afforded by the primary flame resistant protective clothing worn underneath.

In one embodiment, this invention also relates to a garment comprising protective apparel fabric, a fastener assembly for joining a first and a second area of the protective apparel fabric, and a closing flap, each first and second area of protective apparel fabric having an inner garment surface and an outer garment surface and the fastener assembly comprising a fastener having a first fastener tape and a second fastener tape, each fastener tape having an inside surface and an outside surface, each fastener tape further having an attachment area having an inside surface and an outside surface, and a closing area having a row of cooperating fastener elements mounted thereon;

wherein the attachment area of the first fastener tape is attached to the first area of protective apparel fabric, and the attachment area of the second fastener tape is attached to the second area of protective apparel fabric, the closing flap also having an attachment area having an inside surface and an outside surface, and a covering area having an inside surface and an outside surface, wherein the attachment area of the closing flap is attached to either the inside or outside surface of the first fastener tape or the inner or outer garment surface of first area of protective apparel fabric, or some combination of these; the closing flap having a size and shape such that the covering area of the closing flap fully covers the row of cooperating fastener elements mounted on the second fastener tape of the fastener assembly when the fastener assembly is closed, and wherein the closing flap has a first color, or a first visual marking or pattern, and the protective apparel fabric has a different second color, or a different second visual marking or pattern, or only one of the closing flap or protective apparel fabric has a visual marking or pattern.

All the features and elements previously described herein can be applied to this embodiment if desired.

FIG. 1 is an illustration of a garment wherein the color and/or visual marking or pattern of the closing flap is different from and distinct from the protective apparel fabric, which has a contrasting color and no markings or patterns.

In another embodiment, this invention also relates to a garment comprising protective apparel fabric, a fastener assembly for joining a first and a second area of the protective apparel fabric, and a closing flap, each first and second area of protective apparel fabric having an inner garment surface and an outer garment surface and the fastener assembly comprising a fastener having a first fastener tape and a second fastener tape, each fastener tape having an inside surface and an outside surface, each fastener tape further having an attachment area having an inside surface and an outside surface, and a closing area having a row of cooperating fastener elements mounted thereon;

wherein the attachment area of the first fastener tape is attached to the first area of protective apparel fabric, and the attachment area of the second fastener tape is attached to the second area of protective apparel fabric, the closing flap also having an attachment area having an inside surface and an outside surface, and a covering area having an inside surface and an outside surface, wherein the attachment area of the closing flap is attached to either the inside or outside surface of the first fastener tape or the inner or outer garment surface of first area of protective apparel fabric, or some combination of these; the closing flap having a size and shape such that the covering area of the closing flap fully covers the row of cooperating fastener elements mounted on the second fastener tape of the fastener assembly when the fastener assembly is closed, and wherein the closing flap has a first color, or a first visual marking or pattern, and the second fastener tape has a different second color, a different second visual marking or pattern, or only one of the closing flap or second fastener tape has a visual marking or pattern.

All the features and elements previously described herein can be applied to this embodiment if desired.

Figure 4:
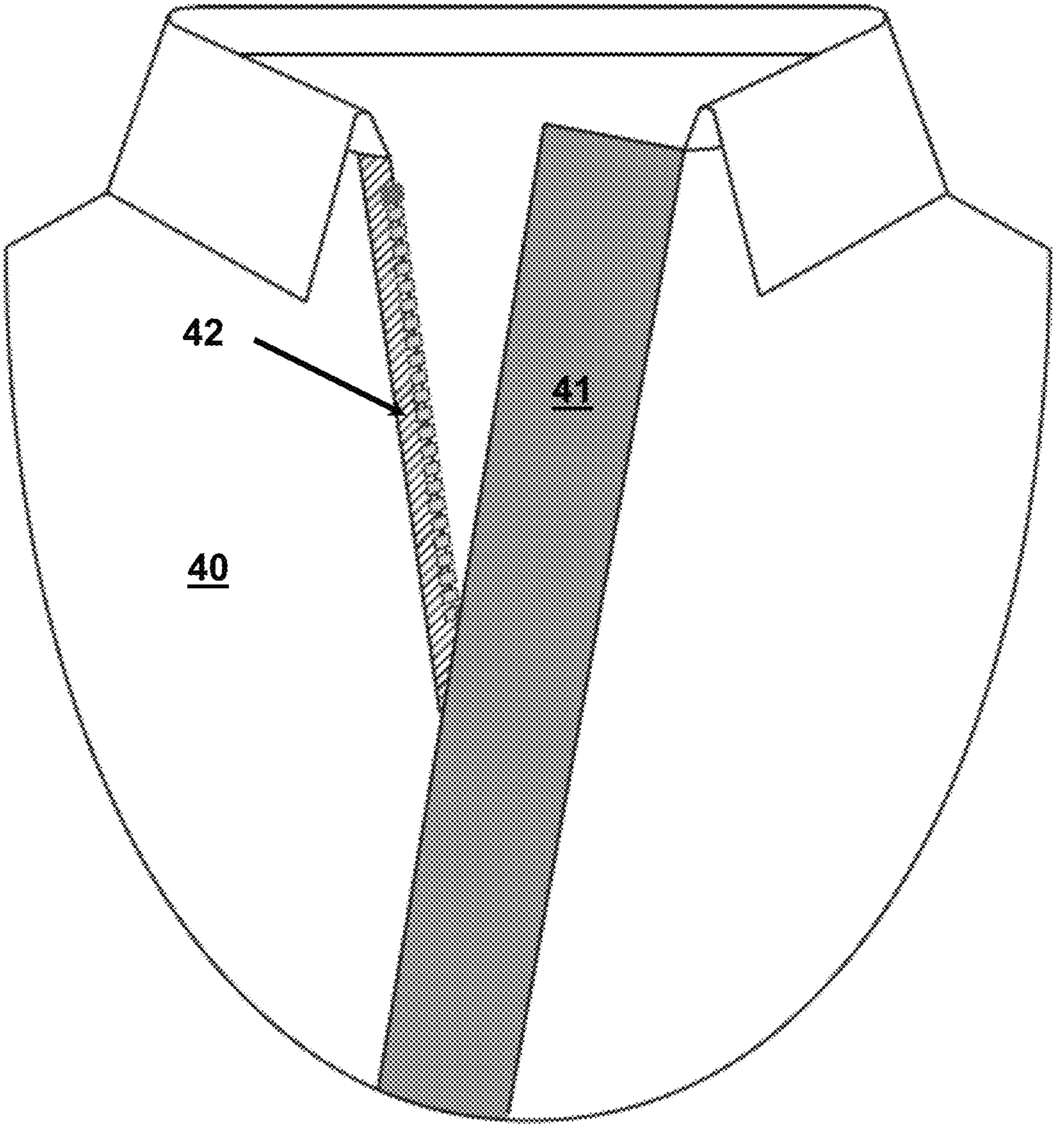
FIG. 4 is a detail of an unfastened garment, illustrating how one embodiment makes the unfastened garment distinctive.

FIG. 4 is a detail of the upper part of an unfastened garment, illustrating how this embodiment makes the unfastened garment distinctive. As shown, the garment 40 has a closing flap 41 having a color that is different from the color of the protective apparel fabric. Further, the closing flap does not have pattern but the second fastener tape 42 has a visual marking or pattern, making it distinct from the closing flap and drawing attention to the fact the garment is at least partially unfastened (unzipped). In this illustration, the protective apparel fabric is also without a visual marking or pattern, adding to the distinctiveness of the garment.

Test Methods

Bending Rigidity (also known as bending stiffness) was measured using a bending tester and the Kawabata Evaluation System (KES), such as is described in U.S. Pat. No. 5,202,086 to Baliga et al. KES is a method of measuring mechanical and surface properties of fabrics using a set of very sensitive instruments described in Kawabata, S., "The Standardization and Analysis of Hand Evaluation", The Textile Machinery Society of Japan, July 1980, 2nd Ed., Osaka, Japan and manufactured by Kato Tekko Co., Kyoto, Japan. In this instrument, a specimen sample is mounted between two chucks (one stationary and one movable) that are 1 cm apart. The specimen is subjected to pure bending between the curvatures $K=-2.5$ and $2.5$ ($cm^{-1}$) with constant rate of curvatures change. The rate is 0.50 ($cm^{-1}$)/sec. The fixed end of the specimen is on a rod which is also supported by piano wires at both ends. The bending moment induced by the bending deformation is picked up by this torque meter arrangement and curvature is detected by measuring the rotation angle of the crank. Through a system of electrical signal circuits, the bending moment and curvature are sent to a x-y recorder and plotted. The slope of the curve of bending moment vs. curvature is bending rigidity (B) and is represented by the following equation:

$$M=BK+H_B$$

where M is bending moment per unit width of fabric (gf cm/cm), K is curvature ($cm^{-1}$), and B is bending rigidity per unit width (gf $cm^2$/cm.) $H_B$ is the intercept when K=0 and is also a measure of hysteresis. The bending stiffness B reported is the mean of two slopes. One of them, $B_f$ is the slope of the M-K curve when the fabric is bent with its surface on the outside. The other is the gradient B g of the similar straight line when the fabric is bent with its back surface to the outside. Thus, $B=(B_f+B_g)/2$. For nonwoven fabrics, bending stiffness 8 is measured for both machine (MD) and transverse (TD) directions by the above procedures and the average of machine (MD) and transverse (TD) direction is reported.

Reference Example 1

The average bending rigidity (8) values of the various polymeric nonwoven fabrics listed in Tables 1 & 2 were measured in gf*$cm^2$/cm using the Kawabata Evaluation System (KES). A higher 8 value indicates greater stiffness. The associated basis weights of these fabrics were measured according to ASTM D3776. The polymeric nonwoven fabrics were made as follows:

- Fabric 1 was a flash-spun polyethylene sheet bonded by embossing with no subsequent softening.
- Fabrics 2 & 3 were a flash-spun polyethylene sheet bonded by embossing followed by pin softening; Fabric 3 had a higher basis weight than Fabric 2.
- Fabric 4 was a flash-spun polyethylene sheet bonded by embossing followed by pin softening, and then one surface of the sheet was coated with a layer of polymer.
- Fabric 5 was a flash-spun polyethylene sheet bonded by embossing followed by pin softening, and then one surface of the sheet was further provided with a microporous film.
- Fabric 6 was a flash-spun polyethylene sheet bonded by embossing followed by pin softening and an additional flame retardant treatment.
- Fabric 7 was a flash-spun polyethylene sheet bonded by embossing followed by pin softening and an additional flame retardant treatment and then a film was laminated to one surface of the sheet.
- Fabric 8 was a point-bonded melt-spun sheet that was further provided with a microporous film on one surface.
- Fabric 9 was a point-bonded sheet known in the art as SMS, made by bonding a sandwich of a melt-spun layer on a melt-blown layer on another melt-spun layer that are successively laid down and then bonded together.

TABLE 1

| Nonwoven Fabric | Bending Rigidity (gf-$cm^2$/cm) | Basis Weight (g/$m^2$) |
|---|---|---|
| 1 | 0.353 | 42 |
| 2 | 0.253 | 42 |
| 3 | 0.287 | 53 |
| 4 | 0.286 | 55 |
| 5 | 0.213 | 59 |
| 6 | 0.355 | 68 |
| 7 | 0.856 | 109 |
| 8 | 0.230 | 60 |
| 9 | 0.169 | 44 |

Example 2

Protective garments with closing flaps (storm flaps) were made; the garments were laid flat and stabilized on a table and were then exposed to an increasingly stronger air current. The air current was supplied onto and parallel to the surface of the garment, blowing into the open side of the closing flap, to determine the amount of air flow that was required to gap the flap or flip the flap open. The flap was considered gapped if the flap lifted from the garment surface more than 0.5 inch. The flap was considered open if the air current pushed the flap past the point the flap was perpendicular to the garment.

The body fabric of all the protective garments was Fabric 2 from Example 1, which was an uncoated flash spun and softened polyethylene nonwoven having a basis weight of 42 g/$m^2$ and a measured bending rigidity of 0.253 grams-force $cm^2$/cm. The control garment had a closing or storm flap made with a single layer of Fabric 2. The inventive garment had the same body fabric as the control garment, but the closing or storm flap was made with a single layer of Fabric 4, which was flash spun and softened polyethylene nonwoven that was coated with a polymeric coating. The closing flaps for both the control and inventive garment were made by sewing the single-layer strips of the flap fabric having a cut flap width of 2³⁄₁₆ inches to the front of the garment as shown in FIG. 2; the final exposed flap had a flap width or finished width of 1¹¹⁄₁₆ inches. The coated nonwoven had a basis weight of 55 g/$m^2$; and the coated nonwoven also had a measured bending rigidity of 0.286 grams-force $cm^2$/cm, which was 13 percent stiffer than the body fabric.

It was found the air flow required to gap the closing flap of the inventive garment more than 0.5 inch was 70% greater than the control garment, and the air flow required to open the closing flap of the inventive garment was 115% greater than the control garment.

Example 3

Example 2 was repeated, again using Fabric 2 as the body fabric of all the protective garments. The control garment again had a closing or storm flap made with a single layer of Fabric 2; however, the inventive garment had the same body fabric as the control garment, but the closing or storm flap was made with a single layer of Fabric 7, which a flash-spun polyethylene sheet bonded by embossing followed by pin softening and then a film was laminated to one surface of the sheet. The closing flaps were the same size as in Example 2. Fabric 7 had a basis weight of 109 g/$m^2$; and had a measured bending rigidity of 0.856 grams-force $cm^2$/cm, which was 238 percent stiffer than the body fabric.

It was found the air flow required to gap the closing flap of the inventive garment more than 0.5 inch was 250% greater than the control garment, and the air flow required to open the closing flap of the inventive garment was 350% greater than the control garment.

Example 4

Various other garments made with closing flap fabrics that are more rigid or stiffer than the body fabric are possible. Table 2 summarizes several different combinations of fabrics that could be used in a garment, each combination having a single layer closing flap that has an average bending rigidity that is at least 7.5 percent greater than the average bending rigidity of the protective apparel fabric. Table 2 includes the percent difference in average bending rigidity for Examples 1 and 2, along with several other combinations of the fabrics described in the Reference Example with their properties shown in Table 1.

TABLE 2

| Body Fabric | Bending Rigidity (gf-cm²/cm) | Flap Fabric | Bending Rigidity (gf-cm²/cm) | Bending Rigidity Difference (%) |
|---|---|---|---|---|
| 2 | 0.253 | 4 | 0.286 | 13 |
| 2 | 0.253 | 7 | 0.856 | 238 |
| 2 | 0.253 | 1 | 0.353 | 40 |
| 6 | 0.355 | 7 | 0.856 | 141 |
| 9 | 0.169 | 4 | 0.286 | 69 |
| 9 | 0.169 | 1 | 0.353 | 109 |
| 1 | 0.353 | 7 | 0.856 | 142 |
| 3 | 0.287 | 7 | 0.856 | 198 |
| 3 | 0.287 | 1 | 0.353 | 23 |
| 8 | 0.230 | 1 | 0.253 | 10 |
| 8 | 0.230 | 4 | 0.286 | 24 |

The invention claimed is:

1. A garment comprising protective apparel fabric, a fastener assembly for joining a first and a second area of the protective apparel fabric, and a closing flap, each of the first and second areas of protective apparel fabric having an inner garment surface and an outer garment surface and the fastener assembly comprising a fastener having a first fastener tape and a second fastener tape, each of the first and second fastener tapes having an inside surface and an outside surface, each of the first and second fastener tapes further having an attachment area having an inside surface and an outside surface, and a closing area having a row of cooperating fastener elements mounted thereon;

wherein the attachment area of the first fastener tape is attached to the first area of protective apparel fabric, and the attachment area of the second fastener tape is attached to the second area of protective apparel fabric, the closing flap also having an attachment area having an inside surface and an outside surface, and a covering area having an inside surface and an outside surface, wherein the attachment area of the closing flap is attached to either the inside or outside surface of the first fastener tape or the inner or outer garment surface of the first area of protective apparel fabric, or some combination of these; the closing flap having a size and shape such that the covering area of the closing flap fully covers the row of cooperating fastener elements mounted on the second fastener tape of the fastener assembly when the fastener assembly is closed, and wherein the closing flap is a single layer fabric having an average bending rigidity that is at least 7.5 percent greater than an average bending rigidity of the protective apparel fabric.

2. The garment of claim 1, wherein the average bending rigidity of the single layer fabric is at least 40 percent greater than the average bending rigidity of protective apparel fabric.

3. The garment of claim 2, wherein the average bending rigidity of the single layer fabric is at least 100 percent greater than the average bending rigidity of protective apparel fabric.

4. The garment of claim 1, wherein the average bending rigidity of the single layer fabric is 0.2800 to 1.2000 grams force per square centimeter per centimeter of length.

5. The garment of claim 4, wherein the average bending rigidity of the single layer fabric is 0.3500 to 1.2000 grams force per square centimeter per centimeter of length.

6. The garment of claim 5, wherein the average bending rigidity of the single layer fabric is 0.8500 to 1.2000 grams force per square centimeter per centimeter of length.

7. The garment of claim 1, wherein the closing flap has a first color, and the protective apparel fabric has a second color, and the first color is different from the second color.

8. The garment of claim 1, wherein the closing flap has a first color, and the second fastener tape has a third color, and the first color is different from the third color.

9. The garment of claim 1 wherein the closing flap has a first color, the protective apparel fabric has a second color, and the second fastener tape has a third color, and wherein the first color, second color, and third color are different from one another.

10. The garment of claim 1 wherein the closing flap has a visual marking or pattern, and the second fastener tape either has no visual marking or pattern or has a different visual marking or pattern.

11. The garment of claim 1 wherein the closing flap has a visual marking or pattern, and the protective apparel fabric either has no visual marking or pattern or has a different visual marking or pattern.

12. The garment of claim 1, wherein the covering area of the closing flap additionally covers a portion of the outer garment surface of the second area of protective apparel fabric when the fastener assembly is closed.

13. The garment of claim 12, wherein the outer garment surface of the second area of protective apparel fabric that is covered by the covering area of the closing flap has a color different from both the closing flap and the protective apparel fabric not covered by the closing flap.

14. A garment comprising protective apparel fabric, a fastener assembly for joining a first and a second area of the protective apparel fabric, and a closing flap, each of the first and second areas of protective apparel fabric having an inner garment surface and an outer garment surface, the fastener assembly having one or more first cooperating fastening element and one or more second cooperating fastening element, wherein the one or more first cooperating fastening element and the one or more second cooperating fastening element include respective mateable portions of a) snaps, b) buttons and loops or buttonholes, c) parallel rows of teeth that mesh, d) parallel rows of interlocking channels or ribs, e) hook-and-loop fasteners, f) magnetic strips, or g) toothless extruded zippers, wherein the one or more first cooperating fastening element is attached to the first area of protective apparel fabric, the one or more second cooperating fastening element is attached to the second area of protective apparel fabric, the closing flap having an attachment area having an inside surface and an outside surface, and a covering area having an inside surface and an outside surface, wherein the attachment area of the closing flap is attached to either the inner or outer garment surface of the first area of protective apparel fabric, the closing flap having a size and shape such that the covering area of the closing flap fully covers the first and second cooperating fastening elements of fastener assembly when the fastener assembly is closed, and wherein the closing flap is a single layer fabric having an average bending rigidity that is at least 7.5 percent greater than an average bending rigidity of the protective apparel fabric.

15. The garment of claim 14, wherein the average bending rigidity of the single layer fabric is at least 40 percent greater than the average bending rigidity of protective apparel fabric.

16. The garment of claim 15, wherein the average bending rigidity of the single layer fabric is at least 100 percent greater than the average bending rigidity of protective apparel fabric.

17. The garment of claim 14, wherein the average bending rigidity of the single layer fabric is 0.2800 to 1.2000 grams force per square centimeter per centimeter of length.

18. The garment of claim 17, wherein the average bending rigidity of the single layer fabric is 0.3500 to 1.2000 grams force per square centimeter per centimeter of length.

19. The garment of claim 18, wherein the average bending rigidity of the single layer fabric is 0.8500 to 1.2000 grams force per square centimeter per centimeter of length.

20. The garment of claim 14, wherein the closing flap has a first color, and the protective apparel fabric has a second color, and the first color is different from the second color.

21. The garment of claim 14, wherein the closing flap has a visual marking or pattern and the protective apparel fabric either has a different visual marking or pattern or has no visual marking or pattern.

22. The garment of claim 14, wherein the covering area of the closing flap additionally covers a portion of the outer garment surface of the second area of protective apparel fabric when the fastener assembly is closed.

23. The garment of claim 22, wherein some portion of the portion of the outer garment surface of the second area of protective apparel fabric that is covered by the covering area of the closing flap has a color different from both the closing flap and the protective apparel fabric not covered by the closing flap.

24. A garment comprising protective apparel fabric, a fastener assembly for joining a first and a second area of the protective apparel fabric, and a closing flap, each of the first and second areas of protective apparel fabric having an inner garment surface and an outer garment surface and the fastener assembly comprising a fastener having a first fastener tape and a second fastener tape, each of the first and second fastener tapes having an inside surface and an outside surface, each of the first and second fastener tapes further having an attachment area having an inside surface and an outside surface, and a closing area having a row of cooperating fastener elements mounted thereon;

wherein the attachment area of the first fastener tape is attached to the first area of protective apparel fabric, and the attachment area of the second fastener tape is attached to the second area of protective apparel fabric, the closing flap also having an attachment area having an inside surface and an outside surface, and a covering area having an inside surface and an outside surface, wherein the attachment area of the closing flap is attached to either the inside or outside surface of the first fastener tape or the inner or outer garment surface of the first area of protective apparel fabric, or some combination of these; the closing flap having a size and shape such that the covering area of the closing flap fully covers the row of cooperating fastener elements mounted on the second fastener tape of the fastener assembly when the fastener assembly is closed, and wherein the closing flap has an inside surface and an outside surface, wherein the outside surface of the closing flap has a first color, or a first visual marking or pattern, and the protective apparel fabric has a different second color, or a different second visual marking or pattern, or only one of the outside surface of the closing flap or protective apparel fabric has a visual marking or pattern.

25. A garment comprising protective apparel fabric, a fastener assembly for joining a first and a second area of the protective apparel fabric, and a closing flap, each of the first and second areas of protective apparel fabric having an inner garment surface and an outer garment surface and the fastener assembly comprising a fastener having a first fastener tape and a second fastener tape, each of the first and second fastener tapes having an inside surface and an outside surface, each of the first and second fastener tapes further having an attachment area having an inside surface and an outside surface, and a closing area having a row of cooperating fastener elements mounted thereon;

wherein the attachment area of the first fastener tape is attached to the first area of protective apparel fabric, and the attachment area of the second fastener tape is attached to the second area of protective apparel fabric, the closing flap also having an attachment area having an inside surface and an outside surface, and a covering area having an inside surface and an outside surface, wherein the attachment area of the closing flap is attached to either the inside or outside surface of the first fastener tape or the inner or outer garment surface of the first area of protective apparel fabric, or some combination of these; the closing flap having a size and shape such that the covering area of the closing flap fully covers the row of cooperating fastener elements mounted on the second fastener tape of the fastener assembly when the fastener assembly is closed, wherein the closing flap has an inside surface and an outside surface, wherein the outside surface of the closing flap has a first color, or a first visual marking or pattern, and the second fastener tape has a different second color, a different second visual marking or pattern, or only one of the outside surface of the closing flap or second fastener tape has a visual marking or pattern;

wherein the closing flap is a single layer fabric having an average bending rigidity that is at least 7.5 percent greater than an average bending rigidity of the protective apparel fabric.

* * * * *